United States Patent
Kim et al.

(10) Patent No.: US 12,353,781 B2
(45) Date of Patent: Jul. 8, 2025

(54) DISPLAY MODULE, MODULAR DISPLAY APPARATUS COMPRISING A PLURALITY OF DISPLAY MODULES AND CONTROL METHOD THEREOF

(71) Applicant: SAMSUNG ELECTRONICS CO., LTD., Suwon-si (KR)

(72) Inventors: Sangwon Kim, Suwon-si (KR); Jeongryeol Seo, Suwon-si (KR); Younghoon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/540,540

(22) Filed: Dec. 14, 2023

(65) Prior Publication Data
US 2024/0168695 A1 May 23, 2024

Related U.S. Application Data

(63) Continuation of application No. PCT/KR2023/018472, filed on Nov. 16, 2023.

(30) Foreign Application Priority Data

Nov. 23, 2022 (KR) .................. 10-2022-0158771

(51) Int. Cl.
*G09G 5/00* (2006.01)
*G06F 3/14* (2006.01)

(52) U.S. Cl.
CPC ........... *G06F 3/1446* (2013.01); *G09G 5/003* (2013.01); *G09G 2300/026* (2013.01); *G09G 2370/04* (2013.01)

(58) Field of Classification Search
CPC ... G06F 3/1423; G06F 3/1466; G09G 3/3275; G09G 2300/026; G09G 2370/04; G09G 2370/08
See application file for complete search history.

(56) References Cited

U.S. PATENT DOCUMENTS

| | | |
|---|---|---|
| 7,339,582 B2 | 3/2008 | Akahori |
| 9,129,551 B2 | 9/2015 | Kim et al. |

(Continued)

FOREIGN PATENT DOCUMENTS

| | | |
|---|---|---|
| CN | 203338717 U | 12/2013 |
| CN | 113707063 A | 11/2021 |

(Continued)

OTHER PUBLICATIONS

International Search Report (PCT/ISA/210) issued Feb. 21, 2024 by the International Searching Authority in International Patent Application No. PCT/KR2023/018472.

(Continued)

*Primary Examiner* — Joe H Cheng
(74) *Attorney, Agent, or Firm* — Sughrue Mion, PLLC

(57) ABSTRACT

Provided is a display module including a communication interface; and a plurality of driver integrated circuits (ICs), wherein a first driver IC among the plurality of driver ICs is configured to: based on obtaining a driving signal from an external device through the communication interface, provide the driving signal to a second driver IC adjacent to the first driver IC so that the driving signal is sequentially provided to remaining driver ICs among the plurality of driver ICs, and provide, to a second display module among the plurality of display modules, the driving signal based on module connection information including whether the second display module is connected to any one display module among the plurality of display modules by a daisy chain method.

17 Claims, 10 Drawing Sheets

(56) References Cited

U.S. PATENT DOCUMENTS

| | | | |
|---|---|---|---|
| 11,074,852 B2 | 7/2021 | Hyeon | |
| 11,094,242 B2 | 8/2021 | Kwon | |
| 11,158,243 B2* | 10/2021 | Seo | G09G 3/32 |
| 11,327,855 B2 | 5/2022 | Kim | |
| 11,380,247 B2* | 7/2022 | Kim | H05B 47/18 |
| 11,455,946 B2 | 9/2022 | Hyeon | |
| 11,972,168 B2* | 4/2024 | Yi | G06F 3/14 |
| 12,125,429 B2 | 10/2024 | Kim et al. | |
| 2005/0012705 A1 | 1/2005 | Akahori | |
| 2008/0074406 A1 | 3/2008 | Matsumoto et al. | |
| 2012/0235964 A1 | 9/2012 | Kim et al. | |
| 2019/0103048 A1 | 4/2019 | Kwon | |
| 2020/0082752 A1 | 3/2020 | Hyeon | |
| 2021/0011820 A1* | 1/2021 | Kim | G06F 3/1446 |
| 2021/0225270 A1 | 7/2021 | Hyeon | |
| 2021/0365230 A1* | 11/2021 | Sul | G06F 3/1446 |
| 2022/0301501 A1* | 9/2022 | Oh | G06F 3/1446 |
| 2023/0146402 A1 | 5/2023 | Kim et al. | |
| 2023/0215345 A1* | 7/2023 | Kim | G09G 5/12 345/55 |
| 2023/0236787 A1* | 7/2023 | Kim | H04N 21/4858 348/383 |
| 2024/0153468 A1* | 5/2024 | Kim | G09G 5/003 |
| 2024/0160397 A1* | 5/2024 | Ahn | G09G 3/3216 |
| 2024/0304127 A1* | 9/2024 | Boo | G06F 3/1446 |

FOREIGN PATENT DOCUMENTS

| | | | |
|---|---|---|---|
| EP | 3761163 A1 | | 1/2021 |
| JP | 2008-83303 A | | 4/2008 |
| JP | 4783253 B2 | | 9/2011 |
| JP | 2018-66831 A | | 4/2018 |
| KR | 10-2004-0070017 A | | 8/2004 |
| KR | 10-2012-0045731 A | | 5/2012 |
| KR | 10-2012-0064212 A | | 6/2012 |
| KR | 10-1186102 B1 | | 9/2012 |
| KR | 101201294 B1 | * | 11/2012 |
| KR | 101511110 B1 | * | 4/2015 |
| KR | 10-2019-0038175 A | | 4/2019 |
| KR | 10-2020-0028142 A | | 3/2020 |
| KR | 10-2021-0007579 A | | 1/2021 |
| WO | 2021/251613 A1 | | 12/2021 |

OTHER PUBLICATIONS

Written Opinion (PCT/ISA/237) issued Feb. 21, 2024 by the International Searching Authority in International Patent Application No. PCT/KR2023/018472.

* cited by examiner

| 300 | 600 | 900 | 1200 |
| --- | --- | --- | --- |
| 200 | 500 | 800 | 1100 |
| 100 | 400 | 700 | 1000 |

DISPLAY MODULE, MODULAR DISPLAY APPARATUS COMPRISING A PLURALITY OF DISPLAY MODULES AND CONTROL METHOD THEREOF

CROSS-REFERENCE TO RELATED APPLICATION(S)

This application is a bypass continuation of International Application No. PCT/KR2023/018472, filed on Nov. 16, 2023, which is based on and claims priority to Korean Patent Application No. 10-2022-0158771, filed on Nov. 23, 2022, in the Korean Intellectual Property Office, the disclosures of which are incorporated by reference herein in their entireties.

BACKGROUND

1. Field

The disclosure relates to a display module, a modular display apparatus including a plurality of display modules and a control method thereof and, more specifically, to a display module of a plurality of display modules connected in a daisy chain method and a control method thereof.

2. Description of Related Art

Recently, display systems of various formats have been developed and distributed.

In accordance with display systems getting larger and having a higher resolution, the number of display modules and display apparatuses constituting a display system is increasing in proportion thereto.

In the case of a modular display apparatus, the size and shape of the modular display apparatus may be variously changed according to the number of display modules constituting the modular display apparatus, the size of the display module, and the like.

In the meantime, when a display module located at an end point outputs a signal, a display module for receiving the output signal does not exist, and thus a problem that noise exceeds a threshold value due to an output signal (for example, a radiation signal) may occur.

As the number of the plurality of display modules increases, the noise significantly exceeds the threshold value, and thus there has been a need for a method for efficiently controlling the signal output of the display module located at the end point has been requested.

SUMMARY

According to an aspect of the disclosure, a display module among a plurality of display modules included in a modular display apparatus includes: a communication interface; and a plurality of driver integrated circuits (ICs), wherein a first driver IC among the plurality of driver ICs is configured to: based on obtaining a driving signal from an external device through the communication interface, provide the driving signal to a second driver IC adjacent to the first driver IC so that the driving signal is sequentially provided to remaining driver ICs among the plurality of driver ICs, and provide, to a second display module among the plurality of display modules, the driving signal based on module connection information including whether the second display module is connected to any one display module among the plurality of display modules by a daisy chain method The first driver IC may be further configured to, based on the any one display module being located at an end point among the plurality of display modules connected by the daisy chain method, not output the driving signal to outside.

The first driver IC may be further configured to: based on the second display module being connected to the any one display module according to the daisy chain method, obtain a connection signal from the second display module, and obtain the module connection information by identifying whether the second display module is connected based on the obtained connection signal.

The first driver IC may be further configured to, based on the second display module being connected, output the driving signal to outside and provide the driving signal to the second display module, and based on the second display module being not connected, not output the driving signal to the outside.

An external device may be a third display module connected to provide the driving signal sequentially to the any one display module according to a timing controller of the modular display apparatus or by the daisy chain method.

The first driver IC may be further configured to identify whether the driving signal is output based on a driving signal obtained from the external device, and wherein the driving signal obtained from a timing controller of the modular display apparatus may include a driving protocol set so that the any one display module located at an end of the plurality of display modules connected by the daisy chain method may be configured to not output the driving signal.

One or more processors of the modular display may be configured to control so that the timing controller sets the driving protocol based on layout information of the modular display apparatus.

The layout information may include connection order information of the plurality of display modules and identification information of each of the plurality of display modules, wherein the driving protocol may include identification information of the any one display module located at the end, and wherein the first driver IC may be configured to not output the driving signal to outside based on the identification information included in the driving protocol.

The plurality of driver ICs are connected by the daisy chain method.

According to an aspect of the disclosure, a method of controlling any one display module includes: providing, by a first driver integrated circuit (IC) among a plurality of driver ICs included in the any one display module, a driving signal to a second driver IC adjacent to the first driver IC so that the driving signal may be sequentially provided to remaining driver ICs; providing, to a second display module among the plurality of display modules, the driving signal based on module connection information including whether the second display module may be connected to the any one display module by a daisy chain method. 1

The providing further may include, based on the any one display module being located at an end point among the plurality of display modules connected by the daisy chain method, not providing the driving signal to outside.

The providing further may include: based on the second display module being connected to the any one display module according to the daisy chain method, obtaining a connection signal from the second display module; and obtaining the module connection information by identifying whether the second display module is connected based on the obtained connection signal.

The providing further may include, based on the second display module being connected, outputting the driving signal to outside and providing the driving signal to the second display module, and based on the second display module being not connected, not outputting the driving signal to the outside.

An external device may be a third display module connected to provide the driving signal sequentially to the any one display module according to a timing controller of the modular display apparatus or by the daisy chain method.

The providing further may include identifying whether the driving signal may be output based on a driving signal obtained from an external device, and wherein the driving signal obtained from a timing controller of the modular display apparatus may include a driving protocol set so that the any one display module located at an end of the plurality of display modules connected by the daisy chain method may be configured to not output the driving signal.

According to an aspect of the disclosure, a display module includes: a plurality of driver integrated circuits (ICs), wherein a first driver IC among a plurality of driver ICs is configured to: based on obtaining a driving signal from an external device, provide the driving signal to a second driver IC adjacent to the first driver IC so that the driving signal is sequentially provided to remaining driver ICs among the plurality of driver ICs, and provide, to a second display module among a plurality of display modules, the driving signal based on module connection information including whether the second display module is connected to any one display module among the plurality of display modules.

The first driver IC may be further configured to, based on the any one display module being located at an end point among the plurality of display modules connected by a daisy chain method, not output the driving signal to outside.

The first driver IC may be further configured to: based on the second display module being connected to the any one display module according to the daisy chain method, obtain a connection signal from the second display module, and obtain the module connection information by identifying whether the second display module is connected based on the obtained connection signal.

The first driver IC may be further configured to, based on the second display module being connected, output the driving signal to outside and provide the driving signal to the second display module, and based on the second display module being not connected, not output the driving signal to the outside.

An external device may be a third display module connected to provide the driving signal sequentially to the any one display module according to a timing controller of a modular display apparatus or by a daisy chain method.

BRIEF DESCRIPTION OF THE DRAWINGS

The above and other aspects, features, and advantages of embodiments of the disclosure will be more apparent from the following description taken in conjunction with the accompanying drawings, in which:

FIG. 2 is a diagram illustrating a modular display apparatus in which a plurality of display modules are combined according to one or more embodiments of the disclosure;

DETAILED DESCRIPTION

Figure 1:
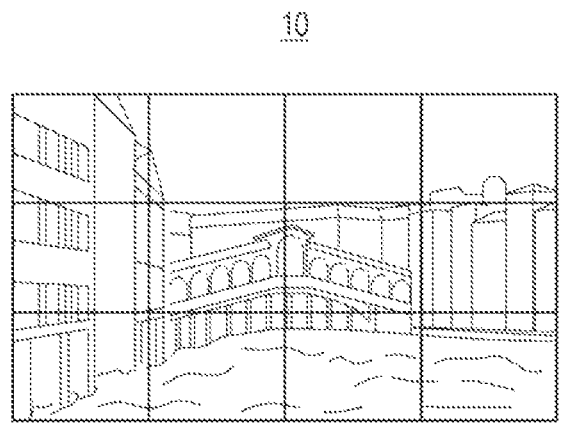
FIG. 1 is a diagram illustrating a modular display apparatus displaying an image according to one or more embodiments of the disclosure.

Terms used in the disclosure will be briefly described, and then the one or more embodiments will be described in detail.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms such as "first," "second," and the like may be used to describe various components, but the components should not be limited by the terms. The terms are used to distinguish a component from another.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

The term such as "module," "unit," "part," and so on in the disclosure may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module and may be realized in at least one processor.

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

FIG. 1 is a diagram illustrating a modular display apparatus displaying an image according to one or more embodiments of the disclosure.

A modular display apparatus 10 according to one or more embodiments of the disclosure may include a plurality of display modules 100, 200, . . . .

For example, referring to FIG. 1, the modular display apparatus 10 according to one or more embodiments of the disclosure may include a plurality of display modules 100, 200, . . . , and each of the plurality of display modules 100, 200, . . . , may be connected by a daisy chain method and configure one display apparatus, that is, the modular display apparatus 10.

FIG. 2 is a diagram illustrating a modular display apparatus in which a plurality of display modules are combined according to one or more embodiments of the disclosure.

Referring to FIG. 2, the modular display apparatus 10 may include a plurality of display modules 100, 200, . . . , and the modular display apparatus 10 may display an image (or a video) using a plurality of display modules 100, 200, . . . .

For example, the modular display apparatus 10 may include a plurality of display modules 100, 200, . . . arranged in a matrix form (e.g., in a 4×3 format). Meanwhile, the 4×3 format is merely an embodiment for convenience of description, and an arrangement format, the number, or the like, of a plurality of display modules 100, 200, . . . constituting the modular display apparatus 10 may be variously changed according to the specification (for example, resolution, size, etc.) of the modular display apparatus 10, the manufacturing purpose of the manufacturer, and the like.

According to an embodiment, the modular display apparatus 10 may be implemented as a TV, but embodiments are not limited thereto, and any device having a display function such as a video wall, a large format display (LFD), a digital signage (digital sign), a digital information display (DID), a projector display, and the like, is applicable.

In addition, the modular display apparatus 10 may be implemented with various types of displays like a liquid crystal display (LCD), organic light-emitting diode (OLED), liquid crystal on silicon (LCoS), digital light processing (DLP), quantum dot (QD) display panel, quantum dot light-emitting diodes (QLED), or the like.

Each of a plurality of display modules 100, 200, . . . according to one or more embodiments of the disclosure may include a plurality of self-emitting elements. The self-emitting elements may be at least one of a light emitting diode (LED) or a micro LED. The micro LED is a ultra-small LED having a size of about 5-100 micrometers and emits light by itself without a color filter.

At least one display module (e.g., first display module 100) among a plurality of display modules 100, 200, . . . constituting the modular display apparatus 10 according to one or more embodiments may be connected to the external device (e.g., timing controller (TCON), another display module, etc.), and may receive a control signal, a driving signal, or the like, from the external device.

According to one or more embodiments, a plurality of display modules 100, 200, . . . may be connected by a daisy chain method. For example, the first display module 100 may be connected to the second display module 200, and the second display module 200 may be connected to the third display module 300. That is, a plurality of display modules 100, 200, . . . may be consecutively connected. The first display module 100 connected to an external device (e.g., TCON) may transmit a control signal, a driving signal, etc. received from an external device to the second display module 200 connected to the first display module 100, and may consecutively transmit the signal to remaining display modules 200, 300, . . . connected by the daisy chain method.

Also, a plurality of display modules 100, 200, . . . may be divided into a plurality of groups, and display modules included in each of the plurality of groups may be connected by a daisy chain method. For example, as shown in FIG. 2, when the plurality of display modules 100, 200, . . . are arranged in a 4×3 format, a plurality of display modules 100, 200, . . . may be divided into first to fourth groups according to a column. However, embodiments are not limited thereto, and a plurality of display modules 100, 200, . . . may be divided into the first to third groups according to a row.

At least one display module (for example, the lowest display module or the leftmost display module) of the display modules included in each group may be connected to an external device (e.g., a source device, a timing controller (TCON), etc.) and may receive a control signal, a driving signal, and the like, from an external device.

For example, the first display module 100 to the third display module 300 may be one group, the first display module 100 may be connected to the second display module 200, and the second display module 200 may be connected to the third display module 300. The first display module 100 connected to the external device may sequentially transmit a control signal, a driving signal, and the like received from the external device to the second display module 200 and the third display module 300 included in the same group with the first display module 100.

Also, the fourth display module 400 to the sixth display module 600 may be one group, the fourth display module 400 may be connected to the fifth display module 500, and the fifth display module 500 may be connected to the sixth display module 600. The fourth display module 400 connected to an external device may sequentially transmit a control signal, a driving signal, etc. received from an external device to the fifth display module 500 and the sixth display module 600 included in the same group with the fourth display module 400.

As another example, each of a plurality of display modules 100, 200, . . . included in the modular display apparatus 10 may be serially connected to each other, and at least one display module that receives a control signal, a driving signal from an external device may transmit, to another display module serially connected, the received control signal, driving signal, or the like, and accordingly, a control signal, a driving signal, or the like, may be sequentially transmitted to all the plurality of display modules 100, 200, . . . .

For example, as resolution, size, etc. of the modular display apparatus 10 increases, the number of a plurality of display modules 100, 200, . . . provided in the modular display apparatus 10 increases proportionally, and connection relationship (for example, connection relationship for each of a plurality of display modules 100, 200, . . . to receive a control signal, a driving signal, etc. from an external device), etc. may be diversely modified in addition to a conventional communication connection relationship of the related art.

In the disclosure, for convenience of description, it is assumed that a plurality of display modules 100, 200, . . . included in the modular display apparatus 10 are divided into a plurality of groups, and display modules included in each of the plurality of groups are connected by a daisy chain method.

Figure 3:
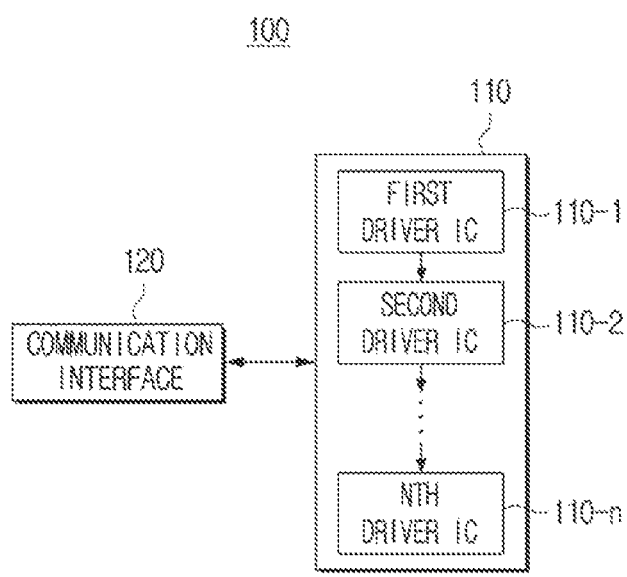
FIG. 3 is a block diagram illustrating a display module according to one or more embodiments of the disclosure.

FIG. 3 is a block diagram illustrating a display module according to one or more embodiments of the disclosure.

Hereinafter, for convenience of description, one of a plurality of display modules 100, 200, . . . is assumed to be the first display module 100, but various embodiments of the disclosure may be implemented in each of a plurality of display modules 100, 200, . . . .

The display module 100 according to an example includes a plurality of driver integrated circuits (ICs) 110 and a communication interface 120.

The communication interface 120 according to an embodiment receives various signals and data. For example, the communication interface 120 may communicate with an external device through various wired/wireless communication methods using an AP-based Wi-Fi (Wireless Local Area Network), Bluetooth, Zigbee, wired/wireless local area network (LAN), WAN (Wide Area Network), Ethernet, IEEE1394, High Definition Multimedia Interface (HDMI), Universal Serial Bus (USB), Mobile High-Definition Link (MHL), Audio Engineering Society/European Broadcasting Union (AES/EBU), optical, coaxial, radio frequency (RF) like near field communication (NFC), infrared (IR) and the like, and may communicate with another display module (for example, a second display apparatus 200 connected to the first display module 100). For example, the communication interface 120 may be implemented as a wired communication interface, for example, a V-by-One, a High Definition Multimedia Interface (HDMI) cable, a Low Voltage Differential Signals (LVDS) cable, a Digital Visual Interface (DVI) cable, a D-subminiature (D-SUB) cable, a Video Graphics Array (VGA) cable, an optical cable, and the like.

According to an example, the communication interface 120 may receive a signal transmitted by an external device. To be specific, the external device may include a timing controller (TCON) provided in the modular display apparatus 10, an electronic device (e.g., source device, etc.), another display module connected to the first display module 100 according to the daisy chain method, or the like.

For example, the TCON provided in the control box of the modular display apparatus 10 may generate a driving signal corresponding to the first to third display modules 100, 200, 300 connected by a daisy chain method according to the control of the controller, and may transmit the generated driving signal to the first display module 100 connected to the TCON.

A first driver IC 110-1 connected to the communication interface 120 among a plurality of driver ICs 110 provided in the first display module 100 may receive a driving signal, and may control pixels corresponding to the first driver IC 110-1 among a plurality of pixels included in the first display module 100 based on the driving signal. A specific description will refer to FIG. 4.

Figure 4:
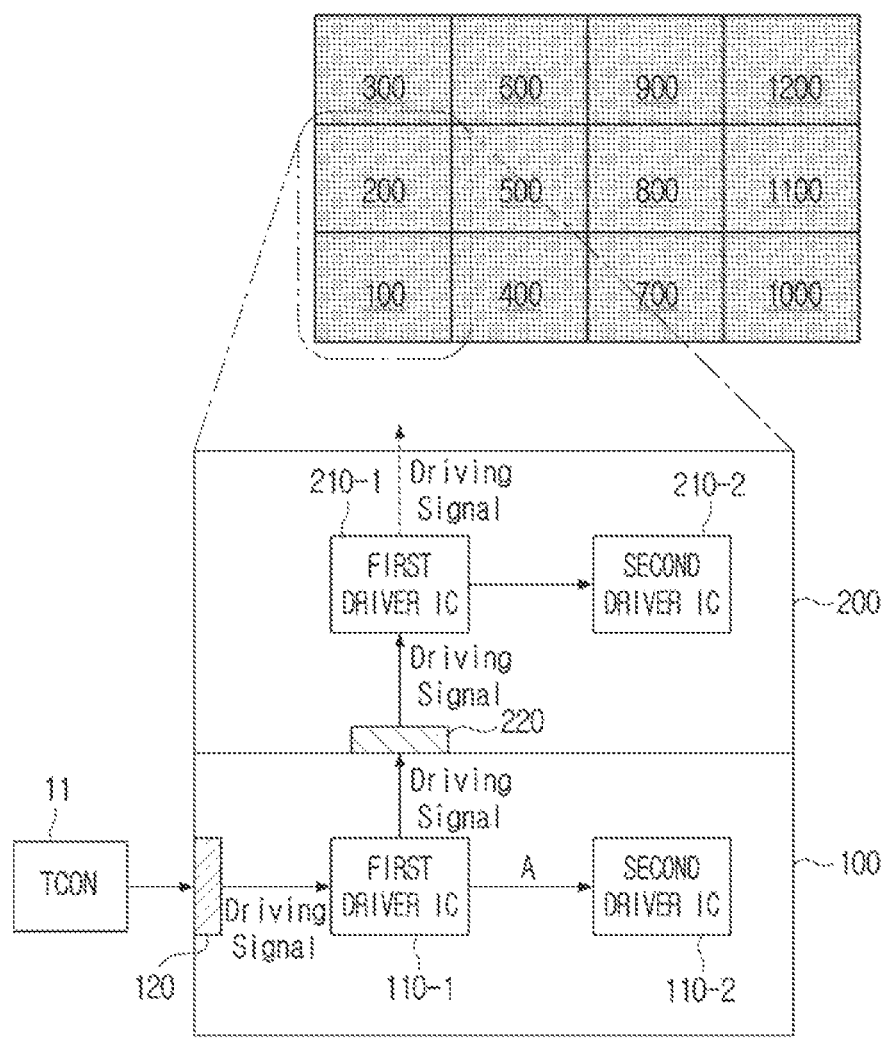
FIG. 4 is a diagram illustrating a plurality of display modules connected by a daisy chain method according to one or more embodiments of the disclosure.

FIG. 4 is a diagram illustrating a plurality of display modules connected by a daisy chain method according to one or more embodiments of the disclosure.

Referring to FIG. 4, a plurality of driver ICs 110 included in the first display module 100 may be connected by a daisy chain method and the first driver IC 110-1 may transmit a driving signal consecutively to remaining driver ICs 110-1, . . . , 110-n connected by the daisy chain method.

Since a plurality of display modules 100, 200, . . . are connected in a daisy chain method, the driving signal generated by the TCON 11 provided in the modular display apparatus 10 according to an embodiment of the disclosure may be transmitted to the remaining display modules (that is, display modules connected to the first display module 100 in a daisy chain method) through the first display module 100.

For example, a plurality of display modules 100, 200, . . . included in the modular display apparatus 10 may be divided into a plurality of groups, and when the display modules included in each of the plurality of groups are connected by a daisy chain method, the TCON 11 provided in the control box of the modular display apparatus 10 may transmit a driving signal corresponding to the first group to the first display module 100 included in the first group (including the first to third display modules 100, 200, 300).

Then, the first display module 100 may control a plurality of pixels included in the first display module 100 by transmitting a driving signal received from the TCON 11 to each of a plurality of driver ICs 110 included in the first display module 100 (for example, sequentially transmitting the driving signal to the plurality of driver IC 110 according to a daisy chain method).

According to an example, the first display module 100 may transmit a driving signal to the second display module 200, and the second display module 200 may transmit a driving signal received from the first display module 100 to each of a plurality of driver ICs 210 included in the second display module 200 (e.g., sequentially transmitting the driving signal to the plurality of driver ICs 210 according to the daisy chain method), thereby controlling a plurality of pixels included in the second display module 200. In addition, the second display module 200 may transmit a driving signal to the third display module 300.

In the meantime, the first driver IC 110-1 among a plurality of driver ICs 110 included in the first display module 100 may identify whether another display module (for example, the second display module 200) is connected to the first display module 100 according to the daisy chain method, and may transmit a driving signal to another display module based on the identification result.

Referring to FIG. 4, the first driver IC 110-1 of the first display module 100 may, when connection of the second display module 200 based on the daisy chain method is identified, transmit the driving signal to the second display module 200.

As another example, the first driver IC 110-1 of the first display module 100 may, when connection of the second display module 200 is not identified, not output a driving signal to the outside. A specific description will be provided with reference to FIG. 5.

Figure 5:
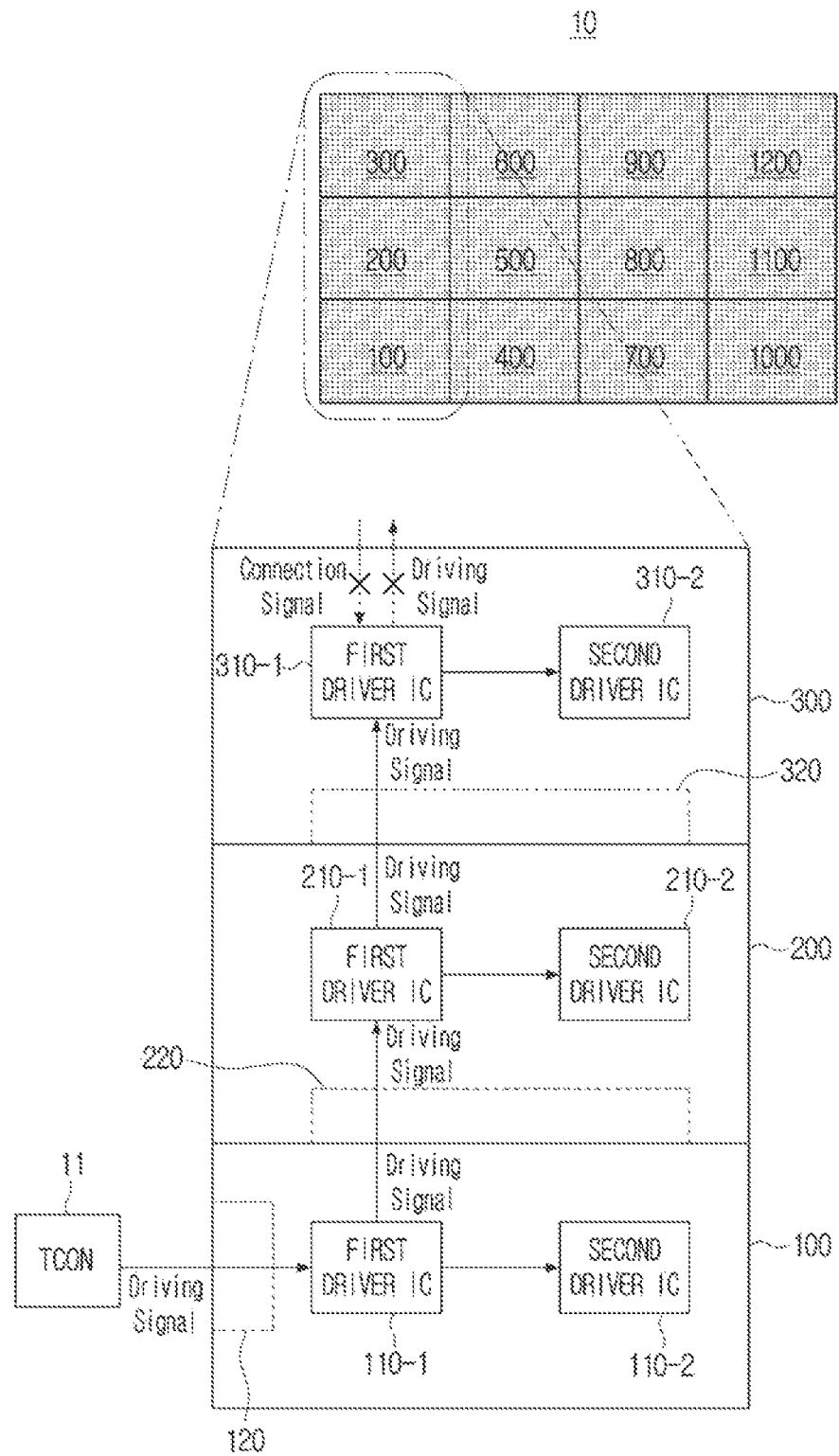
FIG. 5 is a diagram illustrating a display module to determine whether a driving signal is transmitted according to one or more embodiments of the disclosure.

FIG. 5 is a diagram illustrating a display module to determine whether a driving signal is transmitted according to one or more embodiments of the disclosure.

Referring to FIG. 5, the first display module 100 among the first to third display modules 100, 200, 300 connected by the daisy chain method may receive a connection signal from the second display module 200 connected by the daisy chain method. For example, the first display module 100 may identify whether the second display module 200 is connected based on the received connection signal.

For example, the first driver IC 110-1 provided in the first display module 100 may, when a connection signal is received from the first driver IC 210-1 connected to a communication interface 220 and provided in the second display module 200 (e.g., if specific PIN information of the first driver IC 110-1 provided in the first display module 100 corresponds to low information), identify that the second display module 200 is connected. In addition, the first display module 100 may, when the second display module 200 connected to the first display module 100 is identified, output a driving signal to the outside. Therefore, the first display module 100 may transmit a driving signal to the second display module 200.

The first driver IC 210-1 of the second display module 200 may sequentially transmit a driving signal to remaining driver ICs 210-2, . . . connected by a daisy chain method.

As another example, when a connection signal is not received from the first driver IC 210-1 provided in the second display module 200 (e.g., specific PIN information of the first driver IC 110-1 provided in the first display module 100 corresponds to high information), the first driver IC 110-1 provided in the first display module 100 may identify that the second display module 200 is not connected. Subsequently, the first display module 100 may not output a driving signal to the outside if the second display module 200 connected to the first display module 100 is not identified.

For convenience of description, the various embodiments of the disclosure will be limited to an embodiment of the third display module 300 located at an end point among the first to third display modules 100, 200, 300 connected by a daisy chain method.

According to an example, the second display module 200 may receive a connection signal from the third display module 300 connected by a daisy chain method and may identify whether the third display module 300 is connected based on the received connection signal. The second display module 200 may transmit a driving signal to the third display module 300.

In the meantime, the third display module 300 is a display module located at an end point among the first to third display modules 100, 200, 300 connected by a daisy chain method, and thus may not receive a connection signal. For example, when the specific PIN information corresponds to high information, the first driver IC 310-1 provided in the third display module 300 and connected to a communication interface 320 may identify that another display module (e.g., fourth display module 400) is not connected.

Therefore, a display module (e.g., third display module 300) located at an end point among the plurality of display modules 100, 200, . . . connected by a daisy chain method may not output a driving signal to the outside.

In the meantime, the third display module 300 may sequentially transmit, to a plurality of driver ICs 310 connected by a daisy chain method, a driving signal received from the second display module 200.

The first driver IC 310-1 of the third display module 300 may sequentially transmit a driving signal to remaining driver ICs 310-2, . . . connected by a daisy chain method.

Figure 6:
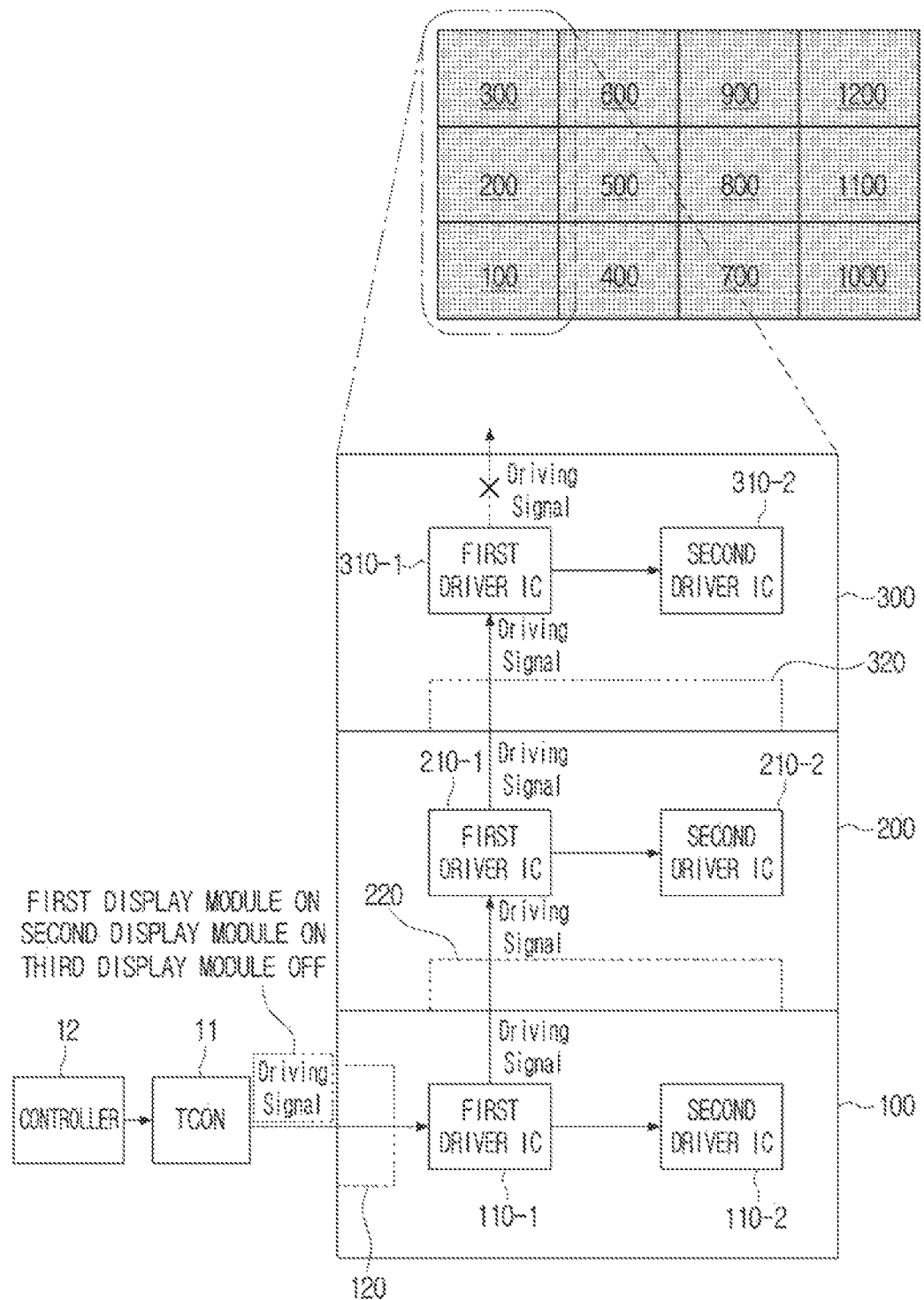
FIG. 6 is a diagram illustrating a driving protocol according to one or more embodiments of the disclosure.

FIG. 6 is a diagram illustrating a driving protocol according to one or more embodiments of the disclosure.

A controller 12 provided in the modular display apparatus 10 according to one or more embodiments may, based on layout information of the modular display apparatus 10, identify an arrangement format of the plurality of display modules 100, 200, . . . and a connection relation among the plurality of display modules 100, 200, . . . , and may obtain identification information of each of the plurality of display modules 100, 200, . . . .

The layout information may be set during a manufacturing process of the modular display apparatus 10 or an installation process of the modular display apparatus 10, or may be set according to a user input.

The controller 12 may include one or more processors, and one or more processors may control overall operations of the modular display apparatus 10.

According to one or more embodiments, one or more processors may be implemented with at least one of a digital signal processor (DSP), a microprocessor, and a time controller (TCON). The processor is not limited thereto and may include at least one or more of a central processing unit (CPU), a micro controller unit (MCU), a micro processing unit (MPU), a controller, an application processor (AP), a communication processor (CP), an advanced reduced instruction set computing (RISC) machine (ARM) processor, and an artificial intelligence (AI) processor or may be defined as a corresponding term. The one or more processors may be implemented in a system on chip (SoC) type or a large scale integration (LSI) type in which a processing algorithm is built therein or in a field programmable gate array (FPGA) type. The one or more processors may perform various functions by executing computer executable instructions stored in a memory.

One or more processors may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. The one or more processors may control one or any combination of other components of the electronic apparatus and may perform operations or data processing relating to the communication. The one or more processors may execute one or more programs or instructions stored in the memory. For example, one or more processors may perform a method in accordance with one or more embodiments of the disclosure by executing one or more instructions stored in a memory.

When a method according to one or more embodiments of the disclosure includes a plurality of operations, a plurality of operations may be performed by one processor or may be performed by a plurality of processors. For example, when a first operation, a second operation, and a third operation are performed by a method according to one or more embodiments, all of the first operation, the second operation, and the third operation may be performed by the first processor, the first operation and the second operation may be performed by a first processor (e.g., a general purpose processor), and the third operation may be performed by a second processor (e.g., an artificial intelligence dedicated processor).

The one or more processors may be implemented as a single core processor including one core, or may be implemented as one or more multicore processors including a plurality of cores (for example, homogeneous multi-cores or heterogeneous multi-cores). When the one or more processors are implemented as a multi-core processor, each of the plurality of cores included in the multi-core processor may include a processor internal memory such as a cache memory and an on-chip memory, and a common cache shared by the plurality of cores may be included in the multi-core processor. In addition, each of a plurality of cores (or a part of a plurality of cores) included in the multi-core processor may independently read and perform a program command for implementing a method according to one or more embodiments of the disclosure, and may read and perform a program command for implementing a method according to one or more embodiments of the disclosure in connection with all (or a part of) a plurality of cores.

When the method according to one or more embodiments of the disclosure includes a plurality of operations, the plurality of operations may be performed by one core among a plurality of cores included in the multi-core processor or may be performed by the plurality of cores. For example, when a first operation, a second operation, and a third operation are performed by a method according to one or more embodiments, all the first operation, second operation, and third operation may be performed by a first core included in the multi-core processor, and the first operation and the second operation may be performed by a first core included in the multi-core processor and the third operation may be performed by a second core included in the multi-core processor.

According to one or more embodiments, the processor may mean a system-on-chip (SoC), a single core processor, a multi-core processor, or a core included in a single core processor or a multi-core processor in which one or more processors and other electronic components are integrated, wherein the core may be implemented as a CPU, a GPU, an APU, a MIC, a DSP, an NPU, a hardware accelerator, or a machine learning accelerator, but embodiments of the disclosure are not limited thereto.

The TCON 11 according to one or more embodiments of the disclosure may generate a driving signal corresponding to the first to third display modules 100, 200, 300 connected by a daisy chain method according to the control of the controller 12, and may transmit the generated driving signal to the first display module 100 connected to the TCON 11.

The first driver IC 110-1 of the first display module 100 may sequentially transmit a driving signal to remaining driver ICs 110-2, . . . connected by a daisy chain method.

In addition, the first driver IC 110-1 may identify whether the driving signal is output to the outside based on the driving signal.

The driving signal received from the TCON 11 may include a driving protocol set so that any one display module (e.g., third display module 300) located at an end point among the plurality of display modules 100, 200, . . . connected by a daisy chain method does not output a driving signal to the outside.

The driving protocol may be generated by the TCON 11 according to control of the controller 12.

The controller 12 according to an example may identify an arrangement format of the plurality of display modules 100, 200, . . . based on the layout information of the modular display apparatus 10 and a connection relation (e.g., connection order information) among a plurality of display modules 100, 200, . . . , and may obtain identification information of each of the plurality of display modules 100, 200, . . . .

Then, the controller 12 may obtain identification information corresponding to any one display module located at an end point among a plurality of display modules 100, 200, . . . connected by the daisy chain method.

For example, the controller 12 may divide a plurality of display modules 100, 200, . . . into a plurality of groups based on the layout information, and may obtain identification information corresponding to the display module located at the end point, among the display modules connected by a daisy chain and included in each group.

Referring to FIG. 6, the controller 12 may identify first display modules to third display modules 100, 200, 300 included in the first group based on the layout information and may obtain identification information (e.g., ID 3) corresponding to the third display module 300 located at an end point among the first to third display modules 100, 200, 300 connected by the daisy chain method.

The TCON 11 may transmit, to a display module located at the very first among the display modules included in the group, a driving signal including a driving protocol set so that the display module located at an end point (the very end) among the display modules included in a group does not output a driving signal to the outside according to control of the controller 12.

Referring to FIG. 6, the TCON 11 may transmit, to the first display module 100, a driving signal including a driving protocol which is set such that each of the first display module 100 and the second display module 200 output a driving signal to the outside, and the third display module 300 does not output a driving signal to the outside.

The first display module 100 may output the driving signal to the outside based on the driving protocol, that is, may transmit the driving signal to the second display module 200. Then, the second display module 200 may output the driving signal to the outside based on the driving protocol, that is, may transmit the driving signal to the third display module 300.

In the meantime, the third display module 300 may not output a driving signal to the outside based on the driving protocol. To be specific, the driving protocol may include identification information (e.g., ID 3) corresponding to the third display module 300 located at the end point among the first to third display modules 100, 200, 300 connected by a daisy chain method, and the first driver IC 310-1 of the third display module 300 may not output a driving signal to the outside based on the identification information corresponding to the third display module 300.

According to an example, the driving protocol may include connection depth information (information about the number of a plurality of display modules connected by the daisy chain method) according to the daisy chain method, and the display module located at the end point among the plurality of display modules connected by the daisy chain method may identify output state of the driving signal based on the connection depth information.

For example, the display module located at the end point among the plurality of display modules connected by the daisy chain method may, when an order of receiving the driving signal corresponds to the connection depth information, not output the driving signal to the outside.

Figure 7:
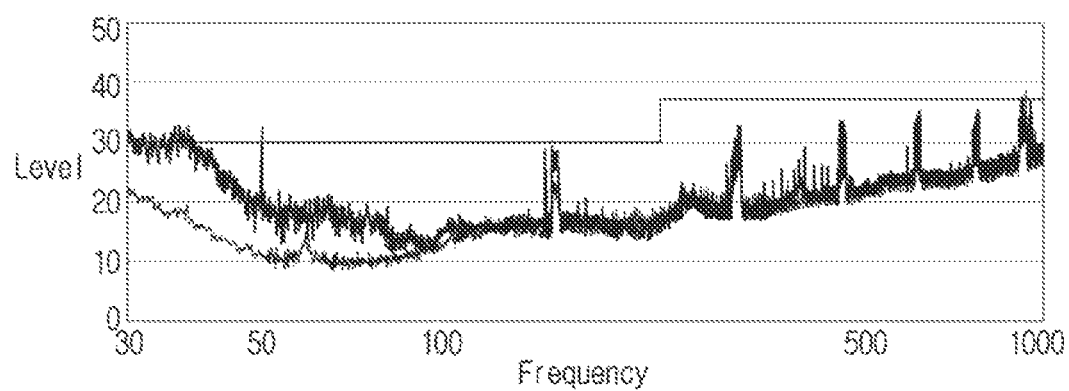
FIG. 7 is a diagram illustrating EMI radiation noise when a display module located at an end among a plurality of display modules connected by a daisy chain method outputs a driving signal according to one or more embodiments of the disclosure.

FIG. 7 is a diagram illustrating EMI radiation noise when a display module located at an end among a plurality of display modules connected by a daisy chain method outputs a driving signal according to one or more embodiments of the disclosure.

Referring to FIG. 7, the plurality of display modules 100, 200, . . . may be divided into a plurality of groups and the display modules included in each of the plurality of groups may be connected by a daisy chain method.

The driving signal output by the display module located at the end point, from each of the plurality of groups, is a radiation signal, and the more the number of the plurality of groups, the number of radiation signal increases proportionally.

For example, the plurality of display modules 100, 200, . . . as illustrated in FIG. 2 may be divided into first to fourth groups according to a column. When each of the third display module 300 located at the end point of the first group, the sixth display module 600 located at the end point of the second group, the ninth display module 900 located at the end point of the third group, and the twelfth display module 1200 located at the end point of the fourth group outputs a driving signal to the outside, a total of four radiation signals may be generated, and there is a problem in that the EMI radiation noise exceeds a threshold value (or tolerable value) due to the radiation signal.

In particular, as the size of the modular display apparatus 10 becomes larger recently, the number of groups constituting the modular display apparatus 10 increases, and the number of radiation signal also increases proportionally, and thus, there is a problem in that the EMI radiation noise of the modular display apparatus 10 significantly exceeds a threshold value (or tolerable value).

Figure 8:
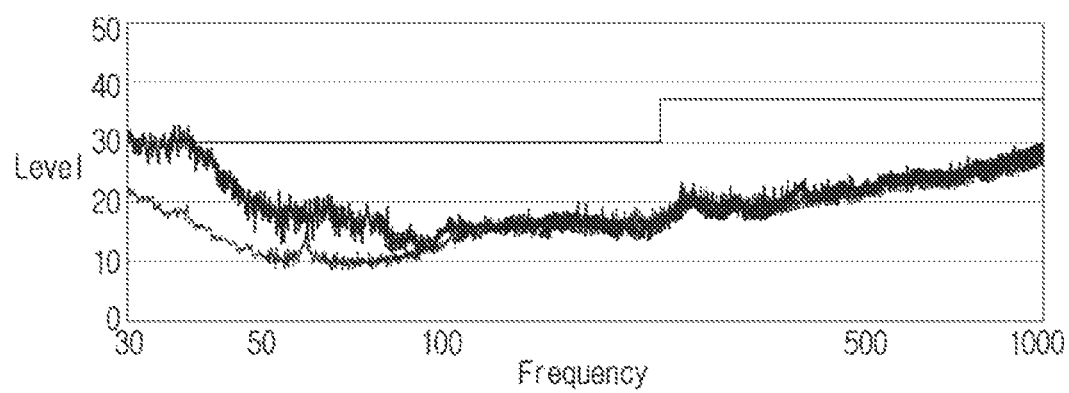
FIG. 8 is a diagram illustrating the EMI radiation noise of a modular display apparatus according to one or more embodiments of the disclosure.

FIG. 8 is a diagram illustrating the EMI radiation noise of a modular display apparatus according to one or more embodiments of the disclosure.

Referring to FIG. 8, a display module located at the end point in each of the plurality of groups included in the modular display apparatus 10 according to various embodiments above may not output a driving signal and thus, a radiation signal may not be generated.

For example, the plurality of display modules 100, 200, . . . as illustrated in FIG. 2 may be divided into the first to fourth groups according to a column. Each of the third display module 300 located at the end point of the first group, the sixth display module 600 located at the end point of the second group, the ninth display module 900 located at the end point of the third group, and the twelfth display module 1200 located at the end point of the fourth group merely receives a driving signal from the second display module 200 of the first group, the fifth display module 500 of the second group, the eighth display module 800 of the third group, the eleventh display module 1100 of the fourth group, but does not output a driving signal to the outside, and the radiation signal may not be generated. Therefore, a problem that EMI radiation noise of the modular display apparatus 10 exceeds a threshold value (or tolerable value) due to a radiation signal may not occur.

Figure 9:
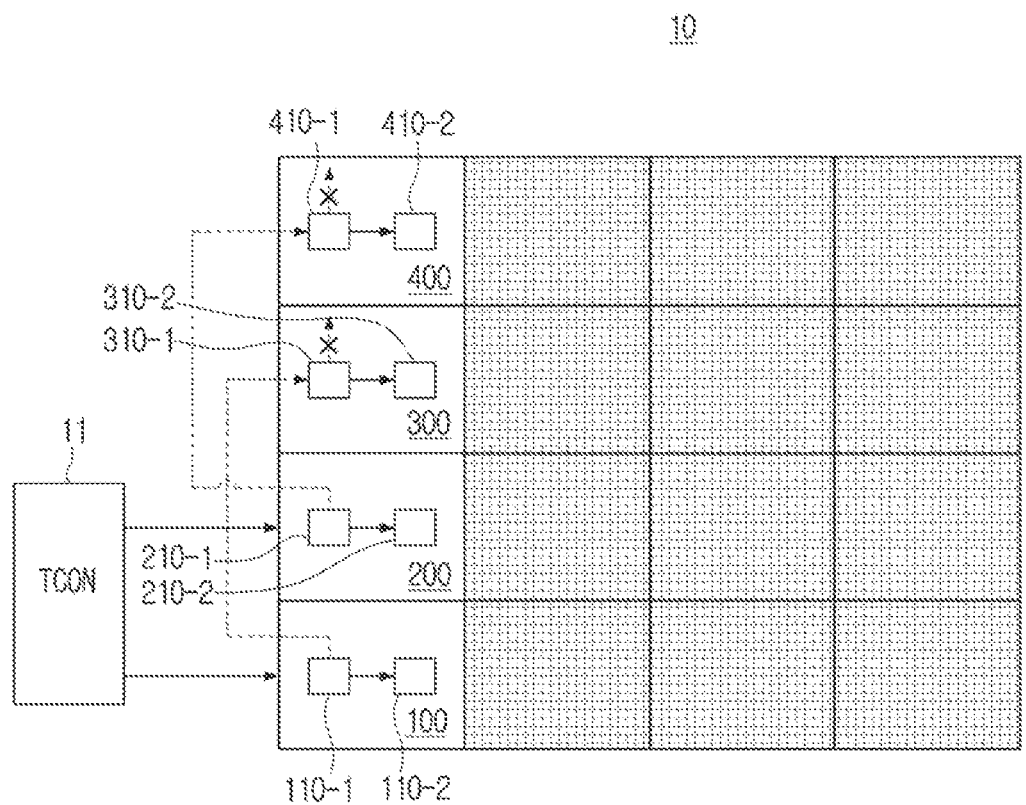
FIG. 9 is a diagram illustrating a plurality of display modules connected by a daisy chain method according to one or more embodiments of the disclosure.

FIG. 9 is a diagram illustrating a plurality of display modules connected by a daisy chain method according to one or more embodiments of the disclosure.

In the above example, it is assumed that the display module (e.g., second display module 200) receives a driving signal from adjacent first another display module (e.g., first display module 100), and identifies whether a connection signal is received from the adjacent second another display apparatus (e.g., third display apparatus 300) or a whether the driving signal is transmitted to the second another display apparatus based on a driving protocol included in the driving signal, but this is merely an example and is not limited thereto.

For example, the display module (e.g., first display apparatus 100) may receive a driving signal from the TCON 11, and may transmit a driving signal to another display apparatus (e.g., third display apparatus 300) that is not adjacent but connected in series.

The another display apparatus may not output a driving signal to the outside.

For example, when a connection signal is not received, the third display module 300 may not output a driving signal to the outside, and if the driving protocol included in the driving signal received from the first display module 100 includes identification information of the third display module 300 (that is, the third display module 300 is located at an end point according to the daisy chain method), the third display module 300 may not output the driving signal to the outside.

In addition, the second display module 200 may receive a driving signal from the TCON 11 and may transmit a driving signal to the fourth display apparatus 400 that is not adjacent but connected in series. The fourth display module 400 may not output a driving signal to the outside.

In the meantime, the modular display apparatus 10 according to one or more embodiments may further include a memory.

According to one or more embodiments, a memory may store data necessary for various embodiments of the disclosure. The memory may be implemented as a memory embedded within the modular display apparatus 10 or a memory detachable from the modular display apparatus 10 according to the usage of data storage.

For example, the data for driving the modular display apparatus 10 may be stored in the memory embedded within the modular display apparatus 10, and the data for upscaling of the modular display apparatus 10 may be stored in the memory detachable from the modular display apparatus 10. In the meantime, the memory embedded in the modular display apparatus 10 may be implemented as at least one of a volatile memory such as a dynamic random access memory (DRAM), a static random access memory (SRAM), a synchronous dynamic random access memory (SDRAM), or a non-volatile memory, such as one time programmable ROM (OTPROM), programmable ROM (PROM), erasable and programmable ROM (EPROM), electrically erasable and programmable ROM (EEPROM), mask ROM, flash ROM, a flash memory, such as NAND flash or NOR flash), a hard disk drive (HDD) or a solid state drive (SSD). In the case of a memory detachably mounted to the modular display apparatus 10, the memory may be implemented as a memory card, such as a compact flash (CF), secure digital (SD), micro secure digital (micro-SD), mini secure digital (mini-SD), extreme digital (xD), or multi-media card (MMC), and an external memory, such as a universal serial bus (USB) memory connectable to the USB port.

According to one or more embodiments, the memory may store at least one instruction for controlling the modular display apparatus 10 or a computer program including instructions.

In particular, a memory may store layout information of the modular display apparatus 10 and the layout information may include connection order information of the plurality of display apparatuses 100, 200, . . . and identification information of each of the plurality of display apparatuses 100, 200, . . . .

Each of the plurality of display apparatuses 100, 200, . . . includes a display, and the display may be implemented as a display including a self-emitting element or a display including a non-self-limiting element and a backlight.

For example, the display may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 130, a backlight unit, a driving circuit which may be implemented as an a-si TFT, low temperature poly silicon (LTPS) TFT, organic TFT (OTFT), or the like, may be included as well. The display may be implemented as a touch screen coupled to a touch sensor, a flexible display, a rollable display, a third-dimensional (3D) display, a display in which a plurality of display modules are physically connected, or the like.

Figure 10:
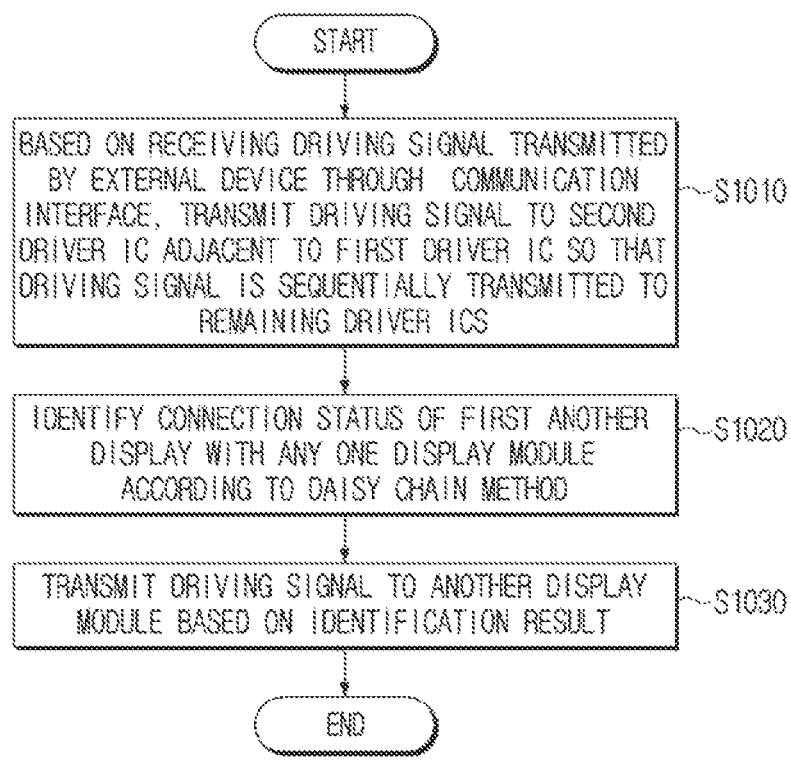
FIG. 10 is a flowchart illustrating a method of controlling a display module according to one or more embodiments of the disclosure.

FIG. 10 is a flowchart illustrating a method of controlling a display module according to one or more embodiments of the disclosure.

A method of controlling any one display module among a plurality of display modules included in a modular display apparatus includes first, transmitting, by a first driver integrated circuit (IC) among a plurality of driver ICs included in the any one display module, a driving signal to a second driver IC adjacent to the first driver IC so that the driving signal is sequentially transmitted to remaining driver ICs in operation S1010.

Subsequently, whether the first another display module is connected to any one display module by the daisy chain method is identified in operation S1020.

Subsequently, a driving signal is transmitted to another display based on the identification result in operation S1030.

The transmitting in operation S1030 may include, based on the any one display module being located at an end point among the plurality of display modules connected by the daisy chain method, not outputting the driving signal to outside.

The transmitting in operation S1020 may include, based on the first another display module being connected to the any one display module according to the daisy chain method, receiving a connection signal from the first another display module, and obtaining the module connection information by identifying whether the first another display module is connected based on the received connection signal.

The transmitting in operation S1030 may include, based on the first another display module being connected, outputting the driving signal to outside and transmitting the driving signal to the first another display module, and based on the first another display module being not connected, not outputting the driving signal to the outside.

The outside device may be one of a second other display module connected to sequentially transmit the driving signal to the any one display module according to a timing controller of the modular display apparatus or the daisy chain method.

The identifying in operation S1020 may include identifying whether the driving signal is output based on a driving signal transmitted by an external device, and the driving signal transmitted from a timing controller of the modular display apparatus may include a driving protocol set so that the any one display module located at an end of the plurality of display modules connected by the daisy chain method is configured to not output the driving signal.

The control method according to an example may further include, by one or more processors of the modular display apparatus, controlling, by a timing controller, to set a driving protocol based on layout information of the modular display apparatus.

The layout information may include connection order information of a plurality of display modules and identification information of each of a plurality of display modules, driving protocol may include identification information of any one display module located at the end point, and the transmitting in operation S1030 may not output the driving signal to the outside based on the identification information included in the protocol.

The plurality of driver ICs may be connected by a daisy chain method according to an example of the disclosure.

The various embodiments of the disclosure may be applied not only to an electronic apparatus but to also various types of electronic apparatuses including a display.

In addition, one or more embodiments described above may be implemented in a computer readable medium, such as a computer or similar device, using software, hardware, or combination thereof. In some cases, the one or more embodiments described herein may be implemented by the processor itself. According to a software implementation, embodiments such as the procedures and functions described herein may be implemented with separate software modules. Each of the software modules may perform one or more of the functions and operations described herein.

According to the embodiments, computer instructions for performing the processing operations of the apparatus may be stored in a non-transitory computer-readable medium. The computer instructions stored in the non-transitory computer-readable medium may cause a particular apparatus to perform the processing operations on the electronic apparatus according to the one or more embodiments described above when executed by the processor of the particular apparatus.

The non-transitory computer readable medium may include a medium that stores data semi-permanently rather than storing data for a very short time, such as a register, a cache, a memory, etc., and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While one or more embodiments of the disclosure have been shown and described, the disclosure is not limited to the aforementioned specific embodiments, and it should be apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display module among a plurality of display modules included in a modular display apparatus, the display module comprising:
   a communication interface; and
   a plurality of driver integrated circuits (ICs),
   wherein a first driver IC among the plurality of driver ICs is configured to:
   based on obtaining a driving signal from an external device through the communication interface, provide the driving signal to a second driver IC adjacent to the first driver IC so that the driving signal is sequentially provided to remaining driver ICs among the plurality of driver ICs,
   provide, to a second display module among the plurality of display modules, the driving signal based on module connection information including whether the second display module is connected to any one display module among the plurality of display modules by a daisy chain method, and
   based on the any one display module being located at an end point among the plurality of display modules connected by the daisy chain method, not output the driving signal to outside.

2. The display module of claim 1, wherein the first driver IC is further configured to:
    based on the second display module being connected to the any one display module according to the daisy chain method, obtain a connection signal from the second display module, and
    obtain the module connection information by identifying whether the second display module is connected based on the obtained connection signal.

3. The display module of claim 2, wherein the first driver IC is further configured to, based on the second display module being connected, output the driving signal to outside and provide the driving signal to the second display module, and
    based on the second display module being not connected, not output the driving signal to the outside.

4. The display module of claim 1, wherein an external device is connected to the modular display apparatus to provide the driving signal sequentially to the any one display module according to a timing controller of the modular display apparatus or by the daisy chain method.

5. The display module of claim 1, wherein the first driver IC is further configured to identify whether the driving signal is output based on a driving signal obtained from the external device, and
    wherein the driving signal obtained from a timing controller of the modular display apparatus comprises a driving protocol set so that the any one display module located at an end of the plurality of display modules connected by the daisy chain method is configured to not output the driving signal.

6. The display module of claim 5, wherein one or more processors of the modular display is configured to control so that the timing controller sets the driving protocol based on layout information of the modular display apparatus.

7. The display module of claim 6, wherein the layout information comprises connection order information of the plurality of display modules and identification information of each of the plurality of display modules,
    wherein the driving protocol comprises identification information of the any one display module located at the end, and
    wherein the first driver IC is configured to not output the driving signal to outside based on the identification information included in the driving protocol.

8. The display module of claim 1, wherein the plurality of driver ICs are connected by the daisy chain method.

9. A method of controlling any one display module among a plurality of display modules included in a modular display apparatus, the method comprising:
    providing, by a first driver integrated circuit (IC) among a plurality of driver ICs included in the any one display module, a driving signal to a second driver IC adjacent to the first driver IC so that the driving signal is sequentially provided to remaining driver ICs;
    providing, to a second display module among the plurality of display modules, the driving signal based on module connection information including whether the second display module is connected to the any one display module by a daisy chain method; and
    based on the any one display module being located at an end point among the plurality of display modules connected by the daisy chain method, not providing the driving signal to outside.

10. The method of claim 9, wherein the providing the driving signal based on the module connection information further comprises:
    based on the second display module being connected to the any one display module according to the daisy chain method, obtaining a connection signal from the second display module; and
    obtaining the module connection information by identifying whether the second display module is connected based on the obtained connection signal.

11. The method of claim 10, wherein the providing the driving signal based on the module connection information further comprises, based on the second display module being connected, outputting the driving signal to outside and providing the driving signal to the second display module, and
    based on the second display module being not connected, not outputting the driving signal to the outside.

12. The method of claim 9, wherein an external device is connected to the modular display apparatus to provide the driving signal sequentially to the any one display module according to a timing controller of the modular display apparatus or by the daisy chain method.

13. The method of claim 9, wherein the providing the driving signal based on the module connection information further comprises identifying whether the driving signal is output based on a driving signal obtained from an external device, and
    wherein the driving signal obtained from a timing controller of the modular display apparatus comprises a driving protocol set so that the any one display module located at an end of the plurality of display modules connected by the daisy chain method is configured to not output the driving signal.

14. A display module comprising:
    a plurality of driver integrated circuits (ICs),
    wherein a first driver IC among the plurality of driver ICs is configured to:
    based on obtaining a driving signal from an external device, provide the driving signal to a second driver IC adjacent to the first driver IC so that the driving signal is sequentially provided to remaining driver ICs among the plurality of driver ICs,
    provide, to a second display module among a plurality of display modules, the driving signal based on module connection information including whether the second display module is connected to any one display module among the plurality of display modules, and
    based on the any one display module being located at an end point among the plurality of display modules connected by a daisy chain method, not output the driving signal to outside.

15. The display module of claim 14, wherein the first driver IC is further configured to:
    based on the second display module being connected to the any one display module according to the daisy chain method, obtain a connection signal from the second display module, and
    obtain the module connection information by identifying whether the second display module is connected based on the obtained connection signal.

16. The display module of claim 15, wherein the first driver IC is further configured to, based on the second display module being connected, output the driving signal to outside and provide the driving signal to the second display module, and
    based on the second display module being not connected, not output the driving signal to the outside.

17. The display module of claim 14, wherein the external device connected to a modular display apparatus to provide the driving signal sequentially to the any one display module according to a timing controller of the modular display apparatus or by the daisy chain method.

\* \* \* \* \*